(12) United States Patent
Beauvais et al.

(10) Patent No.: US 7,715,174 B1
(45) Date of Patent: May 11, 2010

(54) ELECTROLYTIC CAPACITORS WITH ALTERNATE CATHODE MATERIALS FOR USE IN PULSE DISCHARGE APPLICATIONS

(75) Inventors: W. Joseph Beauvais, Stevenson Ranch, CA (US); Melissa A. Moore, Greenville, SC (US); James L. Stevens, Irmo, SC (US); Thomas F. Strange, Easley, SC (US); Christopher R. Feger, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 1093 days.

(21) Appl. No.: 10/848,028

(22) Filed: May 17, 2004

(51) Int. Cl.
*H01G 9/04* (2006.01)
(52) U.S. Cl. ............... 361/528; 361/516; 361/519; 361/523; 361/525
(58) Field of Classification Search ......... 361/508–509, 361/523–541, 503–504, 516–519, 506
See application file for complete search history.

(56) References Cited

U.S. PATENT DOCUMENTS

| | | | | |
|---|---|---|---|---|
| 2,104,797 A | * | 1/1938 | Di Giacomo | 361/530 |
| 2,923,867 A | * | 2/1960 | Robinson | 361/527 |
| 4,020,401 A | | 4/1977 | Cannon et al. | 361/433 |
| 4,024,625 A | | 5/1977 | England | 29/570 |
| 4,121,949 A | | 10/1978 | Walters | 148/6.14 |
| 4,323,950 A | | 4/1982 | Bernard | 361/433 |
| 4,408,257 A | | 10/1983 | Walters | 361/433 |
| 4,466,841 A | | 8/1984 | Walters | 148/6.14 |
| 4,518,471 A | | 5/1985 | Arora | 204/129.1 |
| 4,523,255 A | | 6/1985 | Rogers | 381/433 |
| 4,525,249 A | | 6/1985 | Arora | 204/129.75 |
| 4,800,133 A | | 1/1989 | Arai et al. | 428/608 |
| 4,970,626 A | | 11/1990 | Kakinoki et al. | 361/512 |
| 5,131,388 A | * | 7/1992 | Pless et al. | 607/5 |
| 5,369,547 A | | 11/1994 | Evans | 361/516 |
| 5,469,325 A | | 11/1995 | Evans | 361/526 |
| 5,522,851 A | | 6/1996 | Fayram | 607/5 |
| 5,715,133 A | * | 2/1998 | Harrington et al. | 361/500 |
| 5,754,394 A | | 5/1998 | Evans et al. | 361/516 |
| 5,822,177 A | | 10/1998 | Popp et al. | 361/508 |
| 5,982,609 A | | 11/1999 | Evans | 381/516 |
| 6,006,133 A | * | 12/1999 | Lessar et al. | 607/5 |
| 6,118,652 A | * | 9/2000 | Casby et al. | 361/517 |
| 6,208,502 B1 | | 3/2001 | Hudis et al. | 361/503 |
| 6,287,673 B1 | | 9/2001 | Katsir et al. | 428/210 |
| 6,377,442 B1 | | 4/2002 | Strange et al. | 361/508 |
| 6,455,108 B1 | | 9/2002 | Muffoletto et al. | 427/446 |

(Continued)

*Primary Examiner*—Nguyen T Ha
(74) *Attorney, Agent, or Firm*—Steven M. Mitchell

(57) ABSTRACT

A metal or metal alloy foil substrate, preferably an unetched and uncoated metal or metal alloy foil substrate, such as but not limited to titanium, palladium, lead, nickel, tin, platinum, silver, gold, zirconium, molybdenum, tantalum, palladium-silver alloy, platinum-rhodium alloy, platinum-ruthenium alloy, and/or platinum-iridium alloy, is used as the cathode in an electrolytic capacitor, preferably an aluminum electrolytic capacitor having a multiple anode flat, stacked capacitor configuration. Despite a 120 Hz bridge capacitance measurement lower than with etched aluminum, the use of an unetched and uncoated metal or metal alloy foil cathode according to the present invention will inhibit gas production and not cause the capacitor to swell. Furthermore, an electrolytic capacitor built with a 30 micron unetched and uncoated foil cathode according to the present invention can deliver a stored to discharge energy ratio sufficient for use in pulse discharge applications, such as an in an ICD.

17 Claims, 7 Drawing Sheets

U.S. PATENT DOCUMENTS

| | | | |
|---|---|---|---|
| 6,468,605 B2 | 10/2002 | Shah et al. | 427/600 |
| 6,522,524 B1 * | 2/2003 | Feger et al. | 361/506 |
| 6,562,255 B1 | 5/2003 | Feger | 252/62.2 |
| 6,587,329 B1 | 7/2003 | Feger | 361/504 |
| 6,589,441 B1 | 7/2003 | Feger | 252/62.2 |
| 6,594,139 B2 | 7/2003 | Muffoletto et al. | 361/509 |
| 6,687,116 B2 | 2/2004 | Hudis | 361/508 |
| 6,687,118 B1 | 2/2004 | O'Phelan et al. | 361/508 |
| 6,699,265 B1 | 3/2004 | O'Phelan et al. | 607/1 |
| 6,709,946 B2 | 3/2004 | O'Phelan et al. | 438/396 |
| 6,765,784 B2 * | 7/2004 | Ohya et al. | 361/523 |
| 6,881,232 B2 * | 4/2005 | O'Phelan et al. | 29/25.03 |
| 6,882,522 B2 * | 4/2005 | Naito et al. | 361/523 |
| 6,885,548 B2 * | 4/2005 | Nyberg | 361/523 |
| 6,999,304 B2 * | 2/2006 | Schmidt et al. | 361/528 |
| 7,006,347 B1 * | 2/2006 | Kroll et al. | 361/503 |
| 7,031,139 B1 * | 4/2006 | Fayram | 361/508 |
| 2004/0114311 A1 * | 6/2004 | O'Phelan et al. | 361/530 |
| 2004/0240155 A1 * | 12/2004 | Miltich et al. | 361/512 |

* cited by examiner

ELECTROLYTIC CAPACITORS WITH ALTERNATE CATHODE MATERIALS FOR USE IN PULSE DISCHARGE APPLICATIONS

BACKGROUND OF THE INVENTION

1. Field of the Invention

The present invention relates to cathode electrodes within electrolytic capacitors and, more particularly, to the use of a titanium or similar metal or metal alloy electrode as a cathode electrode within an electrolytic capacitor for use in pulse discharge applications and to an electrolytic capacitor including the cathode electrode of the present invention.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors typically consist of a cathode electrode, an electrically conductive electrolyte and a porous anode with a dielectric oxide film formed thereon. While aluminum is the preferred metal for the anode plates, other metals such as tantalum, magnesium, titanium, niobium, zirconium and zinc may be used. A typical electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

The need for high voltage, high energy density capacitors is most pronounced when employed in implantable cardiac defibrillators (ICDs). In ICDs, as in other applications where space is a critical design element, it is desirable to use capacitors with the greatest possible capacitance per unit volume. Since the capacitance of an electrolytic capacitor is provided by the anodes, a clear strategy for increasing the energy density in the capacitor is to minimize the volume taken up by paper and cathode and maximize the number of anodes. A multiple anode flat, stacked capacitor configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. In order to achieve higher energy densities, it has been necessary to stack three, four and five anodes per layer. However, due to the higher capacitance values achieved with multiple anodes, traditional chemically etched aluminum cathodes provide insufficient capacitance coverage at the desired thickness of 30 microns or less.

It is well understood that, in order to achieve high total capacitance and maximum anode gain realization, the cathode capacitance must be nearly two orders of magnitude higher than the anode stack capacitance that is opposes. When the cathode capacitance is much larger than the anode stack capacitance, the cathode electrode maintains a negative potential. However, if the cathode capacitance is not much larger than the anode capacitance, the cathode electrode can develop a positive potential. If the cathode develops a positive potential, several undesirable effects can occur including oxide buildup on the cathode which reduces the capacitor performance, electrolysis that consumes electrolyte and deteriorates the performance of the capacitor with usage, and production of gaseous electrolysis byproducts that can cause swelling of the capacitor.

Conventional chemically etched aluminum cathodes have been composed of 3003-alloy hard aluminum film of 20 to 70 micron thickness. The aluminum is typically etched in hydrochloric acid (HCl) with or without additional additives. Typical capacitances from such cathodes are given in FIG. 1. A conventional 30 micron aluminum cathode does not provide an adequate anode/cathode capacitance ratio for full 120 Hz capacitance realization in a multiple anode flat, stacked capacitor configuration. In order to realize the anode foil capacitance, a high capacitance cathode foil is needed.

Conventionally, high capacitance cathodes are obtained by using a thin surface-area-enhanced foil with minimal oxide present. Chemical and electrochemical etch processes and deposition processes have been used to increase surface area. Additionally, it is known to coat high surface area materials on to metal foil substrates, such as titanium nitride on aluminum, metal oxides on titanium, or conductive polymers on a variety of metals including aluminum and titanium. For example, the assignee of the present invention has previously used a titanium nitride ($TiN_x$) coated aluminum cathode, purchased from Becromal of America, Inc. of Clinton, Tenn. under the product name BECROMAL Kappa 30B black cathode. A cathode capacitance of 600 to 800 $\mu F/cm^2$ was obtainable in a 30 micron thick BECROMAL Kappa 30B black cathode foil. However, Kappa 30B has been discontinued in the United States.

Known high capacitance cathode technologies present significant problems. Etched aluminum cathodes are technologically limited and can not support the high capacitance required when more than two anodes are placed adjacent to each other in a capacitor stack. Coated cathodes are difficult to obtain commercially and reliably. The titanium nitride coating process is expensive. Metal oxides are difficult to coat in high purity without chloride contamination. Conductive polymers have exhibited stability issues under certain loads and uses. Therefore, there is a need for a cathode that provides suitable coverage to allow for a multi-anode configuration with maximum energy output.

SUMMARY OF THE INVENTION

The present invention is directed to the use of a non-surface-area-enhanced metal or metal alloy electrode as a cathode electrode within an electrolytic capacitor and to an electrolytic capacitor including the cathode electrode of the present invention. According to the present invention, it has been found possible to use a titanium or similar metal or metal alloy foil as the cathode in a multiple anode flat, stacked capacitor configuration. An electrolytic capacitor including the cathode electrode of the present invention may be used in pulse discharge applications, such as ICDs, without discharge energy loss.

According to the present invention, a metal or metal alloy foil, preferably an unetched and uncoated metal or metal alloy foil substrate, such as but not limited to titanium, palladium, lead, nickel, tin, platinum, silver, gold, zirconium, molybdenum, tantalum, palladium-silver alloy, platinum-rhodium alloy, platinum-ruthenium alloy, and/or platinum-iridium alloy, is used as the cathode in a high capacitance multiple anode flat, stacked electrolytic capacitor configuration. In the preferred embodiment, the cathode electrode according to the present invention is not more than 30 microns thick.

The multiple anode flat, stacked capacitor configuration of the present invention comprises a plurality of stacked units consisting of a cathode, a spacer, at least two anodes, a spacer and a cathode, with neighboring stacked units sharing the cathode between them. Preferably the stacked anodes are constructed from high surface area, formed aluminum foil. In a more preferred embodiment, at least one of the stacked units has three or more stacked anodes.

The multiple anode flat, stacked capacitor configuration of the present invention is preferably impregnated with an ethylene glycol based electrolyte, such as an ammonium azelate and boric acid in ethylene glycol or an ammonium borate and ammonium phosphate in ethylene glycol. A cathode depolarizer, preferably a nitroaromatic compound such as nitrobenzene, nitroacetophenone, or nitroanisole, more preferably o-nitroanisole or 3' nitroacetophenone, may be added to the electrolyte to improve the gas evolution behavior of the cathode of the present invention.

In the preferred embodiment of the present invention, an unetched, uncoated titanium foil is used as the cathode material in an aluminum electrolytic capacitor. A titanium electrode is degreased and cut from foil, mesh or other thin, flat fabrications of titanium into the proper shape. It is then interleaved in a multiple anode flat, stacked capacitor configuration with three or more high surface area formed anodes per layer with a nominal effective formation voltage of at least 440 volts for the stacked capacitor. A paper, porous polypropylene or other porous or ion conducting polymer separator is used as a spacer to prevent electrical contact between the anode and cathode. The capacitor electrolyte is typically ethylene glycol based with a straight chain dicarboxlyic acid and/or boric acid. The electrolyte is neutralized with ammonia or an amine and a cathode depolarizer, typically a nitroaromatic compound such as nitrobenzene, nitroacetophenone, or nitroanisole. The capacitor is then aged to a proper voltage and is incorporated into an ICD.

According to the present invention, despite a 120 Hz bridge capacitance measurement lower than with etched aluminum, the use of titanium and similar cathode materials will inhibit gas production and avoid capacitor swelling. Furthermore, the ratio of stored energy to delivered energy is acceptable for a capacitor with 30 micron or thinner titanium. The invention is especially useful when the capacitor is applied to a pulse discharge application since the 120 Hz capacitance is substantially affected. Preparation of an unetched and uncoated cathode according to the present invention also reduces manufacturing expense, as a simple water and alcohol rinse is all that is necessary to prepare the cathode foil for use.

BRIEF DESCRIPTION OF THE DRAWINGS/FIGURES

DETAILED DESCRIPTION OF THE INVENTION

Figure 1:
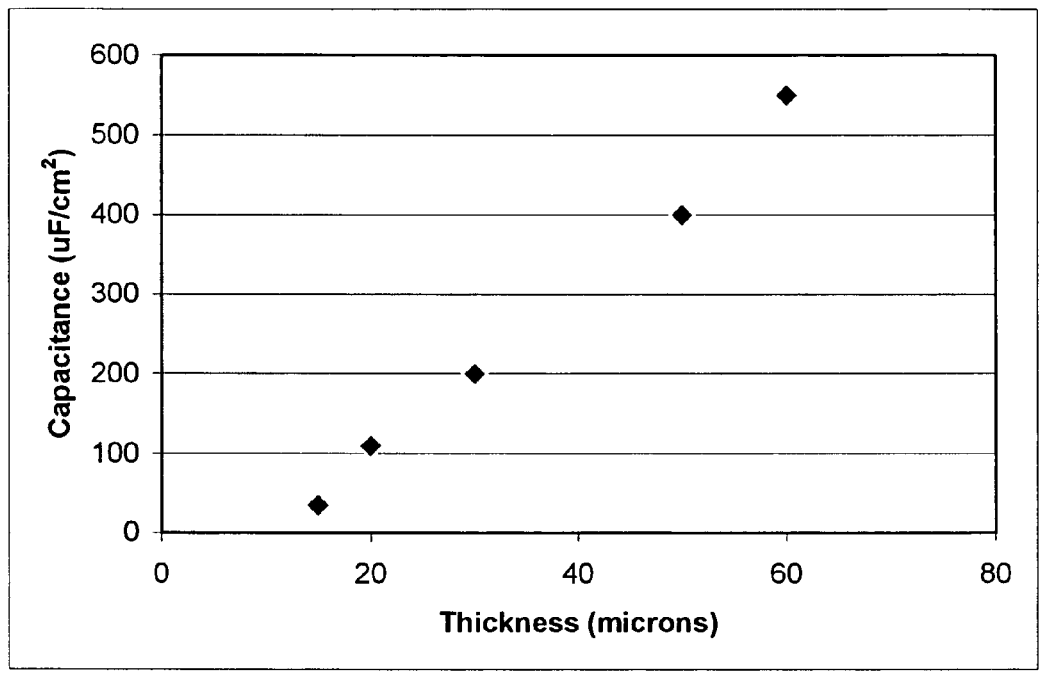
FIG. 1 shows typical capacitance values achieved with conventional chemically etched aluminum cathodes.

The present invention relates to the use of a titanium or similar metal or metal alloy electrode as a cathode electrode within an electrolytic capacitor and to an electrolytic capacitor including the cathode electrode of the present invention. In the course of studying the effect of various cathode materials, it was discovered that unetched and uncoated titanium and similar metal or metal alloy foils can be used as cathodes in pulse discharge electrolytic capacitors without loss of delivered discharge energy and without swelling of the capacitor case due to evolved gas. Preparation of this type of cathode is ideal, as a simple water and alcohol rinse is all that is necessary to achieve the desired effect.

Preferred embodiments of the present invention are now described. While specific configurations and arrangements are discussed, it should be understood that this is done for illustrative purposes only. A person skilled in the relevant art will recognize that other configurations and arrangements can be used without departing from the spirit and scope of the invention. It will also be apparent to a person skilled in the relevant art that this invention can be employed in a variety of other devices and applications.

Whenever an electrode is placed in contact with an electrolyte, a capacitance is developed at the interface. For an electrolytic capacitor with both the anode and cathode immersed in the fill electrolyte, the cathode acquires a capacitance in series with the anode. From the well understood formula (where Cf=Final capacitance, Ca=Anode capacitance, and Cc=Cathode capacitance):

$$Cf = \frac{Ca \cdot Cc}{Ca + Cc}$$

In order to realize 100% of the anode capacitance, the cathode capacitance must appear infinite. As this is unrealistic, a highest possible cathode capacitance is desired. Thickness is also an issue in ICDs as in other applications where space is a critical design element, so high cathode capacitance must not be achieved at the expense of an overly thick cathode. With this in mind, a 30 micron cathode with a capacitance of 170 to 200 μF/cm² has been employed for designs involving a dual anode configuration. For a specific anode capacitance of 2.6 μF/cm² for the two anodes together, a cathode capacitance of 200 μF/cm² leaves a realized capacitance of nearly 99% of the anode.

The advent of porous foil has allowed additional anodes to be stacked in place. With five anodes in place per layer and a conventional 30 micron cathode, the realized capacitance from the anode would be about 97%. However, there is a more insidious problem than simple capacitance loss due to the low capacitance of conventional cathodes.

In an electrolytic capacitor, the anode exhibits a dielectric capacitance capable of holding several hundred volts. The cathode exhibits a native oxide layer in series with a double layer capacitance capable of holding a maximum of approximately three volts, and typically under 1.0 volt. The anode capacitance and the cathode capacitance are in series. When a charged electrolytic capacitor pumps current through a resistive load, the anode dielectric capacitance can be visualized as discharging towards a ground potential; and the cathode double layer capacitance can be visualized as charging from a negative potential to a more positive potential.

Figure 9:
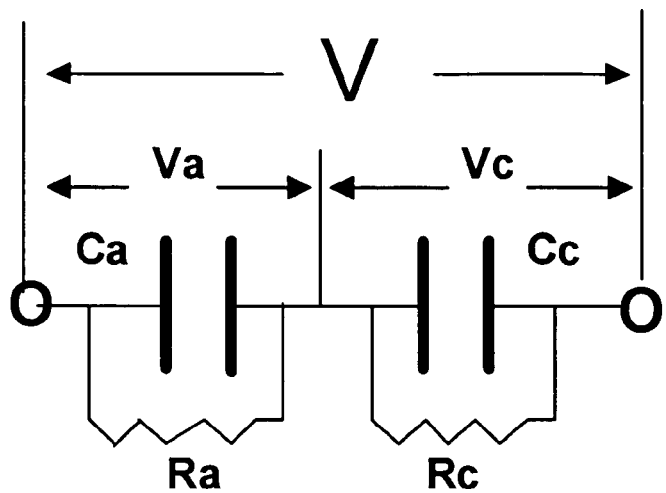
FIG. 9 depicts the voltage during discharge of an electrolytic capacitor.

The diagram in FIG. 9 depicts the voltage division during discharge for an anode/cathode combination. During discharge, the charge passed by the anode to the load must be equaled by the charge passed at the cathode. If this becomes unbalanced during discharge, the cathode potential will be shifted positively. If the cathode develops a positive potential, several undesirable effects can occur: (1) during a pulse discharge operation, a significant overvoltage can be fed back to the cathode, resulting in oxide buildup on the cathode which reduces the capacitor performance, (2) electrolysis can occur that consumes electrolyte and deteriorates the performance of the capacitor with usage, and (3) gaseous electrolysis byproducts can cause swelling of the capacitor.

When the capacitor is charged, positive charge accumulates on the anode foil and negative charge on the cathode foil. When held at potential for an appreciable time, the cathode will self discharge (or depolarize, in electrochemical terms) to some extent due to the fact that valve metal oxides are conductive in the reverse direction. This discharge of the cathode must involve reduction of some electrolyte species such as dissolved oxygen, depolarizer molecules, solvent or solute species or reduction of water to liberate hydrogen gas and hydroxyl/oxygen ions. It is this latter case where hydrogen is evolved that causes swelling in electrolytic capacitors undergoing repeated charge/discharge cycles.

When the capacitor is discharged quickly through an external load, electrons are attracted to the anode from the cathode through the external circuit. If the cathode capacitance-voltage (CV) product is lower than the anode CV product, insufficient charge storage capacity on the cathode results in a momentary positive bias of the cathode with respect to the electrolyte, leading to oxidation at the cathode surface. Little occurs at the anode foil surface since the field there is reduced to zero. If the metal can be oxidized easily, then anodic oxide is formed on the cathode foil as in the case of aluminum. If not, then an electrolyte component will be oxidized instead to liberate the electrons needed to reduce the electric field across the electrolyte-cathode interface to a level sustainable by the Helmholtz or double layer.

Since a reverse voltage drop at the cathode in excess of about one volt results in cathode formation and hydrogen gas production, this undesirable condition determines the condition for the minimum acceptable ratio of cathode to anode capacitance. With the advent of 4 and 5 anode per layer stacks having a capacitance of about 5 to 6 g/cm², conventional aluminum cathodes are unable to provide the high capacitance needed in a 30 micron or thinner foil.

According to the present invention, a metal or metal alloy foil substrate, preferably a valve metal or metal alloy foil substrate, such as titanium, palladium, lead, nickel, tin, platinum, silver, gold, zirconium, molybdenum, tantalum, palladium-silver alloy, platinum-rhodium alloy, platinum-ruthenium alloy, and/or platinum-iridium alloy, is used as the cathode in an electrolytic capacitor. The candidate material must have limited formation ability together with a high hydrogen evolution overpotential and/or hydrogen sorption ability. Alternative elements, alloys and materials may be used without departing from the scope of the present invention as would be apparent to one of ordinary skill in the art. In the preferred embodiment, the cathode electrode according to the present invention is a non-surface-area-enhanced metal or metal alloy foil substrate, not more than 30 microns thick, preferably 10-30 microns thick and more preferably 15 microns thick.

The electrolytic capacitor of the present invention is preferably an aluminum electrolytic capacitor having a multiple anode flat, stacked capacitor configuration. Despite a 120 Hz bridge capacitance measurement lower than with etched aluminum, the use of an unetched and uncoated metal or metal alloy foil cathode according to the present invention will inhibit gas production and not cause the capacitor to swell. Furthermore, an electrolytic capacitor built with a 30 micron unetched and uncoated foil cathode according to the present invention can deliver a ratio of stored energy to discharge energy sufficient for use in pulse discharge applications, such as an in an ICD. The non-surface-area-enhanced cathode can form and self-discharge to allow complete discharge of the anode foil stack.

In the preferred embodiment, the use of an unetched and uncoated titanium foil as the cathode produces capacitor units with the full discharge energy expected from a capacitor stack made with, for example, a high capacitance titanium-nitride-coated Becromal Kappa 30B black cathode. Furthermore, the use of unetched and uncoated titanium cathodes has produced a capacitor that does not exhibit any appreciable swelling. Particularly, while capacitors produced with aluminum cathodes and multi-anode stacks lead to unacceptable swelling and discharge energy loss within 500 discharge cycles, capacitors produced according to the present invention can sustain over 2500 cycles with negligible swelling.

Preparation of an unetched, uncoated cathode foil according to the present invention is ideal, as a simple water and alcohol rinse is all that is necessary to prepare the metal foil for incorporation into a multiple anode, flat, stacked capacitor configuration. However, in an alternative embodiment of the present invention, it is possible to further enhance the surface area of the metal or metal alloy foil substrate to improve the electrochemical effect of the cathode of the present invention. For example, the metal or metal alloy foil may be etched, sandblasted and/or sintered, or a mesh titanium material or the like may be used. Surface area enhanced titanium and other metals will behave like the foils discussed above, but with enhanced capacity, albeit with increased manufacturing complexity and cost.

Figure 2:
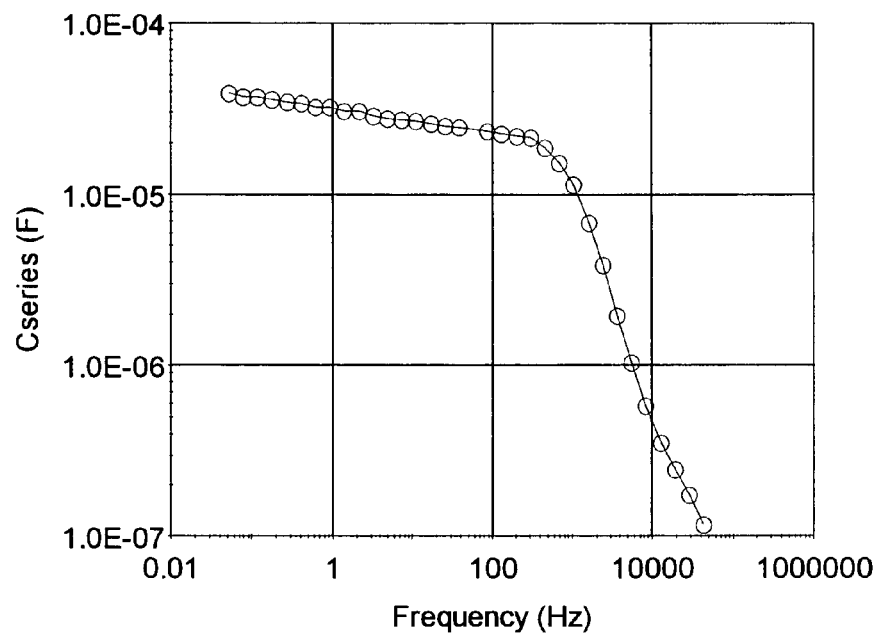
FIG. 2 shows the frequency response of a titanium cathode according to the present invention in a working electrolyte.

Electrochemical Impedance Spectroscopy (EIS) was used to study the frequency response of the titanium cathode in a working electrolyte. As shown in FIG. 2, the titanium foil shows a relatively flat capacitance response at frequencies below 1000 Hz. A low capacitance of 20 to 40 μF/cm² with good frequency response was observed for the titanium foil cathode at open circuit potential (OCP). Capacitance was not shown to vary significantly when biased with ±0.5 V versus OCP. Since the effective double layer capacitance of titanium foil is low, cathodic reactions from the resulting overpotential will take place during the capacitor charging process. Similarly, anodic reactions will take place during the discharging process.

Figure 3:
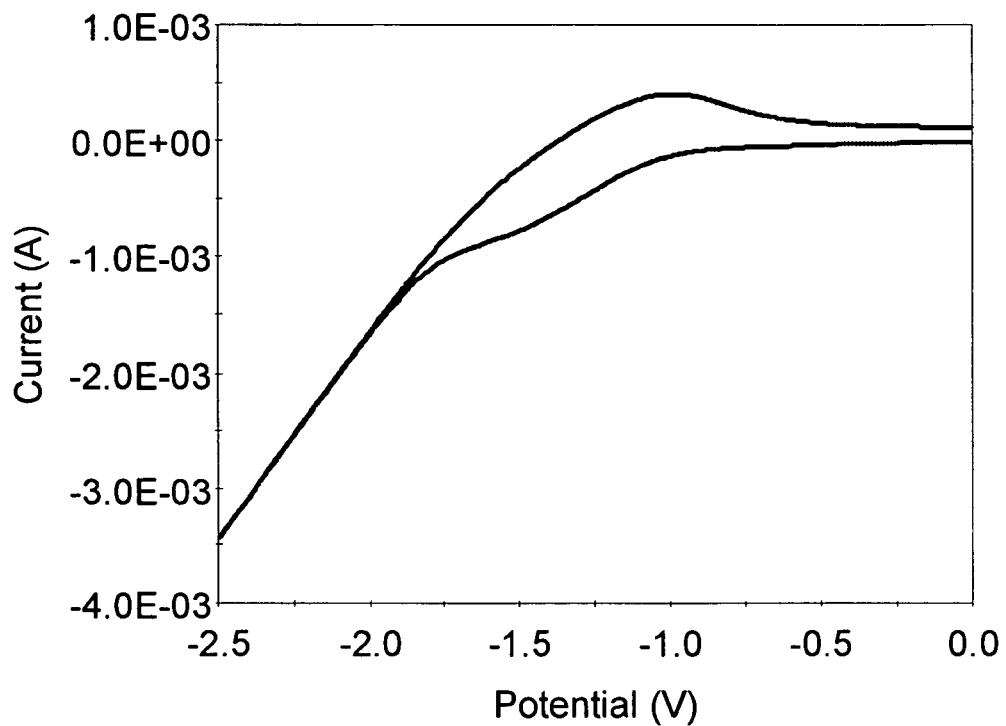
FIG. 3 shows a cathodic capacitance-voltage (CV) scan of a titanium cathode according to the present invention in the working electrolyte.

FIG. 3 shows the cathodic capacitance-voltage (CV) scan of the titanium foil in the working electrolyte, which reveals hydrogen reduction to be the main reaction. An X-ray Diffraction (XRD) pattern of the titanium foil after the cathodic CV scan shows the presence of the titanium hydride ($TiH_2$) phase. The formation of $TiH_2$ can prevent hydrogen gas evolution to some extent.

Figure 4:
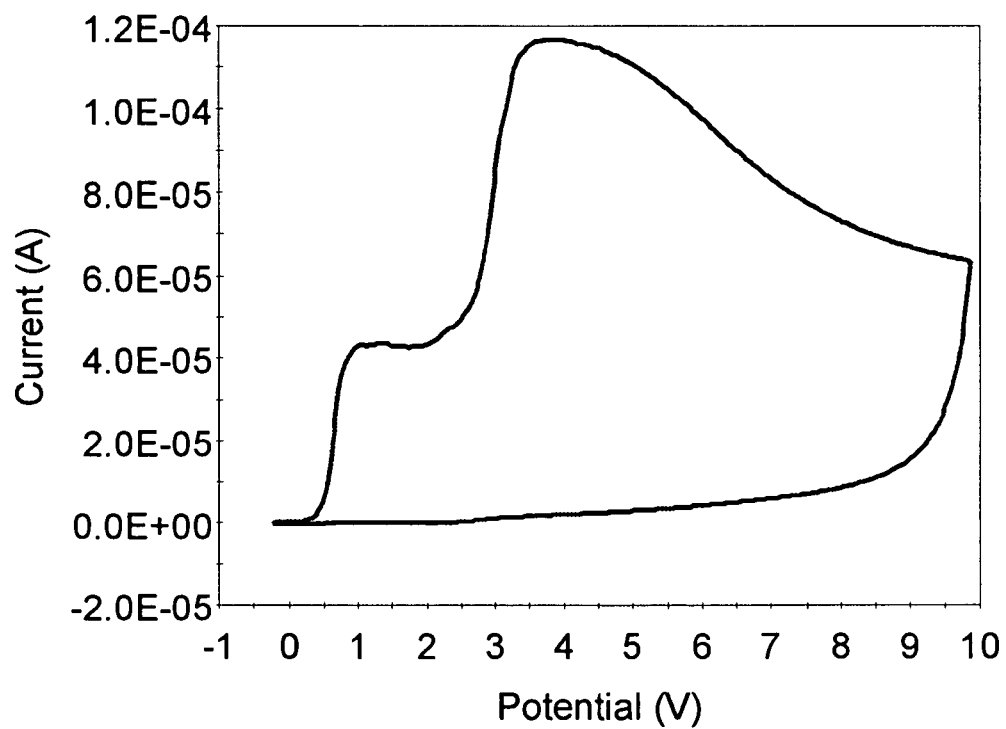
FIG. 4 shows an anodic CV scan of a titanium cathode according to the present invention in the working electrolyte.

FIG. 4 shows the anodic CV scan of the titanium foil in the working electrolyte. The anodic CV scan shows the oxidation of titanium to titanium dioxide ($TiO_2$), and the oxidation of electrolyte components, if the voltage is driven further anodically.

These electrochemical reactions give the titanium cathode a high equivalent pseudo-capacitance, which allows the realization of the full capacitance of the anode foil. In reality, this is not a true pseudo-capacitance effect, because most of these reactions are irreversible. Nevertheless, the reactions provide a current path to charge and discharge the anode foil, where the majority of the ICD capacitor energy is stored, and the full discharge energy can be delivered.

Titanium is among the group of metals, including lead and palladium, with a much larger range than metals like aluminum of cathodic current densities below the hydrogen evolution overpotential. This larger range of current densities before the hydrogen overpotential is reached means that a higher charging current density can be tolerated before the diffusion limit is reached. At the diffusion limit, water and other compounds are reduced to hydrogen. Practical charging rates for defibrillator capacitors appear to produce current densities that fall at or below this threshold for titanium and similar materials with high hydrogen evolution overpotential and low formation efficiency, but not for aluminum.

Titanium is also among the group of metals, including nickel and palladium, known to store hydrogen within the metal lattice as an intermetallic compound. This property is exploited extensively in hydrogen storage applications such as fuel cells. If hydrogen is brought into intimate contact with or generated on a titanium, palladium or nickel surface, then a hydrogen sorption reaction occurs in preference to the production of gaseous hydrogen.

Titanium foils according to the present invention were shown to have less gas evolution than aluminum when exposed to 0.1 $mA/cm^2$ of cathodic current in an ammonium azelate and boric acid in ethylene glycol electrolyte. Similarly, titanium foils did not produce any appreciable amount of gas when exposed to 0.1 $mA/cm^2$ of cathodic current in the ammonium azelate and boric acid in ethylene glycol electrolyte with 1% 3'-nitroacetophenone, a depolarizing agent. Other metals, including palladium and lead, evolved less gas than the titanium foil. When both aluminum and titanium foils were evaluated for gas production in various electrolytes, titanium evolved less gas regardless of the electrolyte tested.

The fact that hydrogen gas is not evolved on the aluminum anode stack foil during the discharge phase is a transient effect related to the fact that the now-cathodic anode stack has a greater CV product than the cathode foil. This fact allows sufficient field to appear across the anode stack Helmholtz layers to start a cathodic hydrolysis reaction. Accordingly, the re-imposition of the normal capacitor bias attracts the excess hydrogen ions produced at the cathode foil to the surface for reduction and/or sorption during the charging phase. In the case of aluminum, the hydrogen ions are reduced to hydrogen gas at the cathode foil. However, in the presence of titanium and similar metal and metal alloys according to the present invention and depolarizing agents according to the present invention, the hydrogen ions participate in reduction of the depolarizer and/or sorption into the cathode material.

According to the present invention, metal and metal alloy foils, preferably unetched and uncoated titanium and similar metal and metal alloys, can be used as cathodes in pulse discharge electrolytic capacitors without loss of delivered discharge energy and without the swelling of the case due to evolved gas typical of low capacitance aluminum cathodes. Use of an electrolyte containing a depolarizing agent appears to further improve the gas evolution behavior of the titanium cathode of the present invention. Preparation of this type of cathode is ideal, as a simple water and alcohol rinse is all that is necessary to achieve the desired effect.

Figure 10:
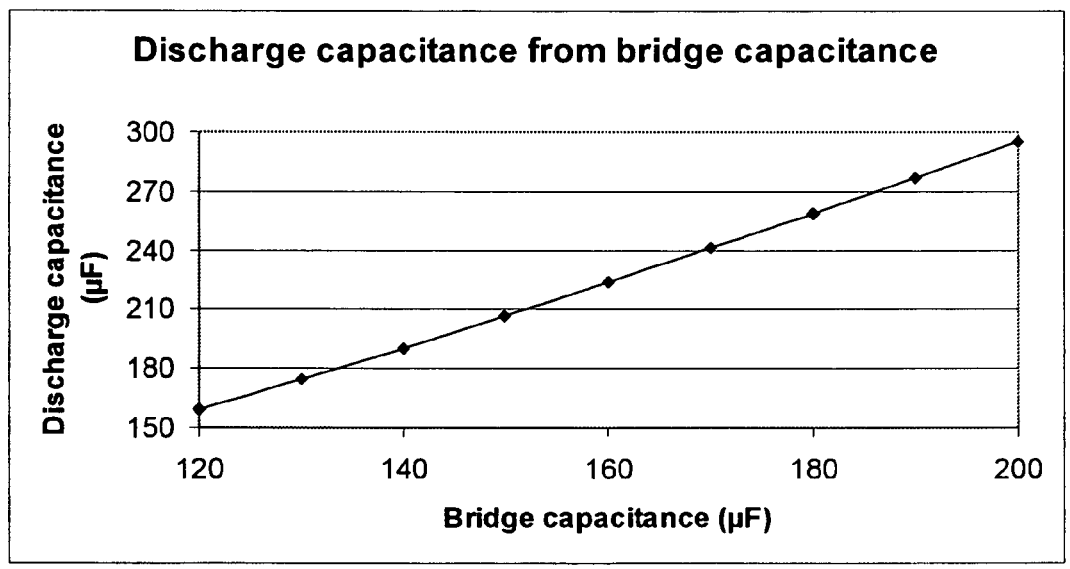
FIG. 10 shows the relationship between bridge capacitance and discharge capacitance for an exemplary titanium cathode according to the present invention.

Bridge capacitance readings for the cathodes of the present invention can be correlated to actual discharge capacitance in a finished capacitor. This can be accomplished by obtaining an average bridge reading for the cathode. Using this value, the equation for total capacitance shown above can be used to determine the contribution from the anode. Observation of data has shown that for a 400 volt capacitor of about 150-250 µF, the discharge capacitance is 15% greater than the corresponding bridge capacitance. Hence a graph can be constructed to relate the bridge and discharge capacitance, as shown in FIG. 10 for a titanium cathode. For the graph in FIG. 10, the following assumptions and data were used: 15 $\mu F/cm^2$ bridge capacitance for Ti, 12 cathodes at 5 $cm^2$ area per capacitor; 15% increase in discharge capacitance from "good" 120 Hz bridge capacitance value. Devices with differing assumptions of cathode area would require a new graph based on those values, as would be apparent to one of ordinary skill in the art.

An electrolytic capacitor according to the present invention is constructed of anode and cathode layers, stacked with a paper insulator or spacer between each layer. The anode layer is composed of two or more anode foils stacked together without any paper spacer, to form a high energy density anode element. The anode and cathode layers are then grouped together in a parallel connection to produce sufficient capacitance for the intended function. This finished stack is inserted into a case with a geometry closely following the contour of the stack, and designed to minimize the space occupied inside the finished defibrillator. A wound roll configuration may also be used, as would be apparent to those skilled in the relevant art.

Figure 8:
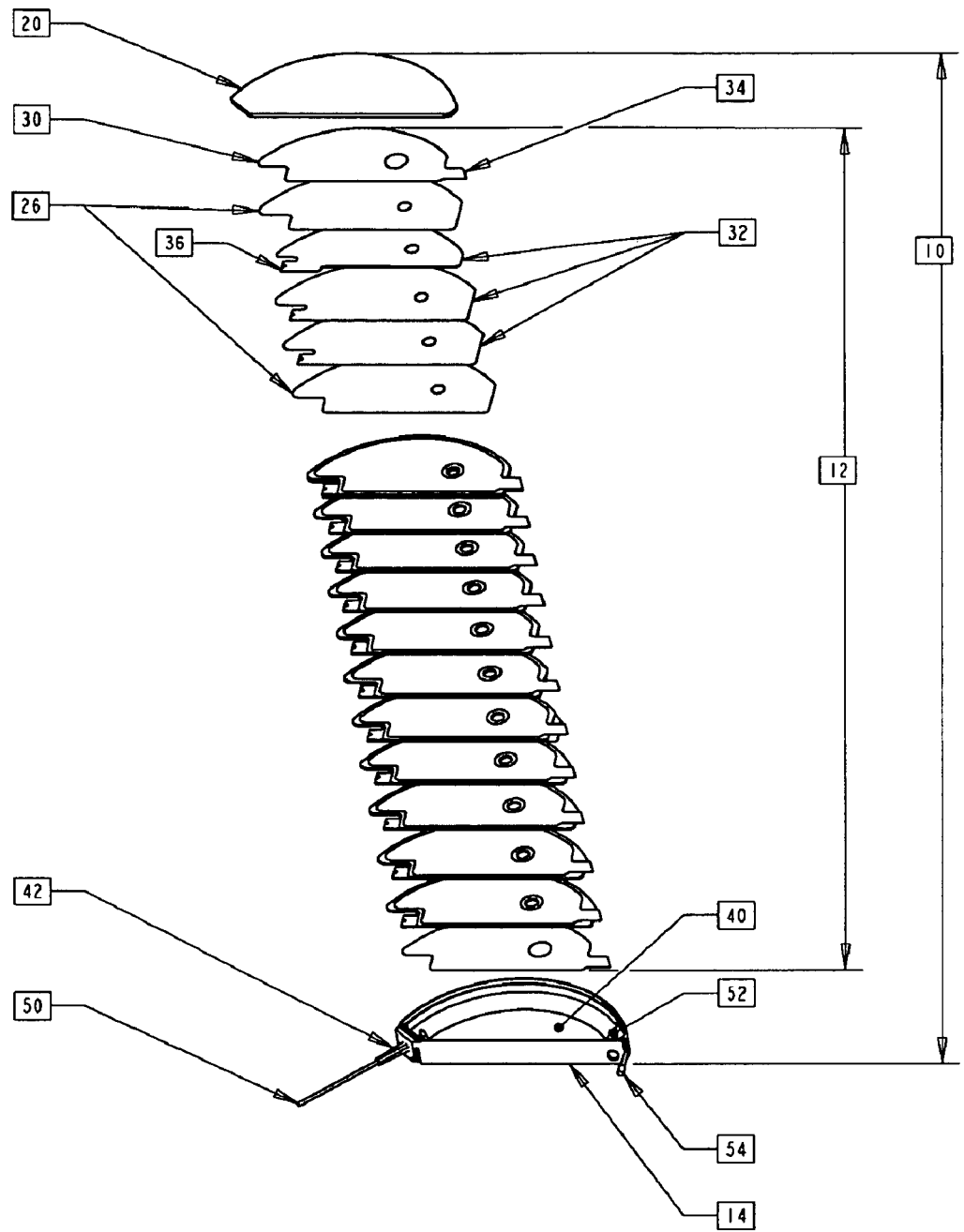
FIG. 8 shows an electrolytic capacitor having a multiple anode flat, stacked capacitor configuration according to the present invention.

FIG. 8 illustrates a capacitor 10 having a multiple anode flat, stacked capacitor configuration 12 according to the present invention. Flat stack 12 consists of alternating conductive and separator sheets within a housing 14 enclosed by a lid 20. The sheets alternate between paper separator sheets 26, and conductive cathode sheets 30 or multiple layer anode sheets 32. In the spaces formed between adjacent separator sheets, the cathodes alternate with the multiple layer anodes. In the preferred embodiment, the dielectric is provided by an oxide layer on the etched surface of the anodes, while the cathode includes the conductive sheets, the electrolyte-saturated separator layers, and the electrolyte that fills the tunnels on the surface of the anodes. Each of the cathodes 30 has a cathode tab 34, all of which are registered with each other to be compressed together for electrical interconnection. Similarly, each of the anodes 32 has an anode tab 36, registered with each other to be compressed together for electrical interconnection. The illustration shows each anode layer having three anodes per layer for example, although according to the present invention, there may be two or more anodes per layer. Additionally, one or both of the end cathodes may be removed, with the housing itself connected to the other cathodes and functioning as a cathode. The housing 14 is an aluminum container that defines a chamber 40 in which the stack 12 is closely received. The chamber has a depth equal to the thickness of the stack. The housing is provided with a feed through connector 42, which has an electrically conductive lead 50 that extends out of the housing for connection to other circuitry, with an insulative sleeve surrounding the lead and closely received in a bore defined in the wall of the housing to form an environmental seal. The anode tabs 36 are welded together and electrically connected to the terminal of feed through 42. The housing also includes a cathode attachment step 52 in its interior at a position registered with the ends of the cathode tabs 34, so that the tabs may be staked or welded as a bundle to the step for electrical connection to the housing. A cathode lead 54 is directly electrically connected to the housing for connection to the cathodes. In an embodiment in which the cathode is isolated from the housing, in which the housing is non-conductive, or in which cathodes of different groups are isolated from each other, insulated feed-throughs like those for the anodes may be used.

Aluminum foil is preferred for the anode layers, because of its ability to produce a sufficient quality oxide layer, its conductive properties, and its wide commercial availability. Other valve metal foils conventionally utilized in electrolytic capacitors could also be used, including titanium, tantalum, magnesium, niobium, zirconium and/or zinc. Preferably, a strip of unetched, high purity (99.99%) aluminum foil with high cubicity, wherein at least 85% of the crystalline aluminum structure is oriented in a normal position (i.e., a (1,0,0) orientation) relative to the surface of the foil, is used. Such foils are well-known in the art and are readily available from commercial sources known to those skilled in the art.

In a preferred embodiment of the present invention, the anode foil may be etched in an aqueous halide based etch solution, typically a hydrochloric acid or sodium chloride solution, according to a conventional etch process; for example, U.S. Pat. No. 5,715,133 to Harrington et al. describes a suitable method of etching foil and is incorporated herein by reference in its entirety. The etch solution preferably consists of about 1.3% by weight sodium chloride, about 3.5% by weight sodium perchlorate, about 0.35% sodium persulfate, and deionized water. The etch solution preferably is heated to a temperature in the range of about 60° C. to about 95° C. The foil is etched at a DC current density of about 0.01 A/cm$^2$ to about 0.30 A/cm$^2$. A charge of about 20 coulombs/cm$^2$ to 100 coulombs/cm$^2$ is passed through the foil during the etching process, which requires an etch time in the range of about 2 minutes to about 12 minutes.

The foil is then removed from the etch solution and rinsed in deionized water. The tunnels formed during the initial etch are then widened, or enlarged, in a secondary etch solution, typically an aqueous based nitrate solution, preferably between about 1% to about 20% aluminum nitrate, more preferably between about 10% to about 14% aluminum nitrate, with less than about 1% free nitric acid. The etch tunnels are widened to an appropriate diameter by methods known to those in the art, such as that disclosed in U.S. Pat. No. 4,518,471 and U.S. Pat. No. 4,525,249, both of which are incorporated herein by reference.

After the etch tunnels have been widened, the foil is again rinsed with deionized water and dried. Finally, a barrier oxide layer may be formed onto one or both surfaces of the metal foil by placing the foil into an electrolyte bath and applying a positive voltage to the metal foil and a negative voltage to the electrolyte. The barrier oxide layer provides a high resistance to current passing between the electrolyte and the metal foils in the finished capacitor, also referred to as the leakage current. A high leakage current can result in the poor performance and reliability of an electrolytic capacitor. In particular, a high leakage current results in greater amount of charge leaking out of the capacitor once it has been charged.

The formation process consists of applying a voltage to the foil through an electrolyte such as boric acid and water or other solutions familiar to those skilled in the art, resulting in the formation of an oxide on the surface of the anode foil. The preferred electrolyte for formation is a 100-1000 µS/cm, preferably 500 µS/cm, citric acid concentration. In the case of an aluminum anode foil, the formation process results in formation of aluminum oxide (Al$_2$O$_3$) on the surface of the anode foil. The thickness of the oxide deposited or "formed" on the anode foil is proportional to the applied voltage, roughly 10 to 15 Angstroms per applied volt.

The etched and formed anode foils are cut and the capacitor is assembled. According to the present invention, an unetched and uncoated metal or metal alloy foil substrate, preferably a valve metal or metal alloy foil substrate, such as titanium, palladium, lead, nickel, tin, platinum, silver, gold, zirconium, molybdenum, tantalum, palladium-silver alloy, platinum-rhodium alloy, platinum-ruthenium alloy, and platinum-iridium alloy, is degreased to remove any oils or residue and cut to the proper cathode shape. An unetched, uncoated titanium foil substrate is preferred. Preferably, the metal foil substrate is cleaned in a simple water and alcohol rinse. The metal foil is then interleaved as a cathode between three or more high surface area, formed anode foils with a nominal effective formation voltage of at least 440 volts for the stacked capacitor.

A paper separator or other fiber with sufficient thickness and density, such as Kraft paper, manila, esparto or hemp, is used to prevent electrical contact between the anode and cathode. Also different porous polymer sheets, such as porous polypropylene, could be used as well as ion conducting polymers to prevent electrical contact between the anode and cathode. An electrolytic capacitor stack according to the present invention consists of a number of units of: a cathode, a spacer, two or more anodes, a spacer and a cathode; with neighboring units sharing the cathode between them. In the preferred embodiment, four anodes are provided per layer of the stack.

The pre-assembled capacitor is then vacuum impregnated with an electrically conductive electrolyte, by placing the capacitor in contact with the electrolyte and reducing the pressure to less than 50 cm Hg. The capacitor electrolyte is typically ethylene glycol based with a straight chain dicarboxlyic acid and/or boric acid, such as the electrolytes disclosed in U.S. Pat. Nos. 6,562,255 and 6,589,441, incorporated herein by reference. The electrolyte is neutralized with ammonia or an amine and a cathode depolarizer, typically a nitroaromatic compound such as nitrobenzene, nitroacetophenone, or nitroanisole, may be added to the electrolyte to improve the gas evolution behavior of the titanium cathode, preferably and addition of 1% to 3% by weight cathode depolarizer. The capacitor is held at this low pressure for 5 to 45 minutes and then pressure is restored, using the pressure to force the electrolyte mixture into the capacitor stack. The capacitor is then removed and placed in an oven at a temperature of about 65° C. to about 90° C. and a maximum oxygen atmospheric concentration of 2% for a period of about 2 hours to about 24 hours. The capacitor is then aged in a normal manner by applying the working voltage to the capacitor, allowing the capacitor to reach this voltage, and then allowing the current to decrease.

Electrolytic capacitors according to the present invention can be incorporated into implantable medical devices, such as implantable cardioverter defibrillators (ICDs), as would be apparent to one skilled in the art, as described in U.S. Pat. No. 5,522,851.

Having now generally described the invention, the same will be more readily understood through reference to the following examples. The following examples are illustrative, but not limiting, of the method and compositions of the present invention. Other suitable modifications and adaptations of the variety of conditions and parameters normally encountered and obvious to those skilled in the art are within the spirit and scope of the invention.

EXAMPLES

Example 1

Finished capacitors according to the present invention were constructed with several different raw metals as cathode material. Grade 1 titanium, grade 2 titanium and nickel foils were all used as cathode material. Each metal sample was pretreated with an alcohol and water rinse before being used in a capacitor. As a control, capacitors were also constructed with Becromal Kappa 30B cathode material.

Each capacitor was impregnated with an ammonium azelate and boric acid in ethylene glycol electrolyte and then tested. The total delivered energy, stored energy, and ESR were measured for each capacitor tested. Four capacitors were constructed and measured for each type of cathode material. Table 1, below, displays the average of these four measurements for each type of capacitor.

TABLE 1

| Type of Cathode | Total Delivered Energy (J) | ESR (Ω) | Stored Energy (J) |
| --- | --- | --- | --- |
| Kappa 30B (control) | 15.65 | 1.06 | 17.87 |
| Grade 1 Titanium | 15.50 | 1.06 | 17.60 |
| Grade 2 Titanium | 15.53 | 0.99 | 17.68 |
| Nickel | 15.62 | 0.99 | 17.87 |

These capacitors were also pulsed through a 10 ohm resistor. Following 500 pulses, the nickel cathode capacitors lost approximately 1 J of total delivered energy (down to about 14.5 J), while the grade 1 and grade 2 titanium cathode capacitors lost about 0.1 J of total delivered energy. After 500 pulses, the Kappa 30B cathode capacitors did not show any loss of delivered energy.

Additionally, these capacitors were pulsed a total of 2500 times into a 10 ohm load and swelling was measured for each type of capacitor. After 2500 pulses, capacitors containing grade 2 titanium cathodes and Becromal Kappa 30B cathodes both had little appreciable swelling. The capacitors containing grade 1 titanium cathodes had slightly more swelling than either grade 2 titanium or Kappa 30B. The capacitors containing nickel cathodes did not make it to 2500 pulses. Between 500 and 1000 pulses, the capacitors containing nickel cathodes were extremely swollen and testing was discontinued.

These results indicate that either grade of titanium shows promise as a cathode material. Both grades had comparable delivered energies to standard Kappa 30B black cathodes. Additionally, both grades had very little swelling after 2500 pulses.

Example 2

Slide capacitors were constructed with a four anode per layer stack, six layers of 0.25 mil Kraft paper in 1.0 g/cc density (available from MEDielectrics, Inc. of Mt. Holly Springs, Pa.), two grade 2 titanium cathode foils (nominal thickness 0.001"), an electrolyte and a platinum wire separated from a cathode by one sheet of paper. The slide capacitors were built as follows: glass slide—titanium cathode—three layers of Kraft paper—welded four anode stack—two layers of Kraft paper—platinum wire—one layer Kraft paper—titanium cathode—glass slide. The platinum wire served to measure the pulse discharge voltage at the cathode.

The slide capacitors were vacuum impregnated with one of the following electrolytes: (a) ammonium azelate and boric acid in ethylene glycol (hereinafter "Electrolyte A"), (b) ammonium azelate and boric acid in ethylene glycol with 1% o-nitroanisole (hereinafter "Electrolyte B"), (c) ammonium azelate and boric acid in ethylene glycol with 1% 3'-nitroacetophenone (hereinafter "Electrolyte C"), or (d) ammonium borate and ammonium phosphate in ethylene glycol (hereinafter "Electrolyte D").

Following impregnation, the slide capacitors were aged to 405V at 1 mA and 37° C. After aging, the current was allowed to bleed down to approximately 0.5 mA. Following current bleed down, the slide capacitors were pulsed through a 75 ohm resistor to simulate the RC time constant of production capacitors being discharged through a 10 ohm resistor, and the discharge voltage was measured.

Each slide capacitor was connected to an oscilloscope to measure the cathode discharge voltage. The ground clip was hooked to the cathode and the probe tip was hooked to the platinum wire. The oscilloscope x-axis was set at 2.0 volts and the y-axis was set at 1.0 milliseconds. It was set to trigger on a downward voltage drop of 4.5 volts, with a pre-trigger capture of 27%, or 2.7 milliseconds.

Pulsed slide caps revealed that capacitors with titanium cathodes resulted in a moderately low discharge voltage in each type of electrolyte tested. Titanium cathodes pulsed in electrolytes that did not contain a depolarizing agent (Electrolytes A and D) generally had a lower and more consistent pulse discharge voltage than titanium cathodes pulsed in electrolytes that did contain a depolarizing agent (Electrolytes B and C). Titanium cathode slide capacitors containing Electrolytes B and C showed a trend of increasing discharge voltages over a course of twenty pulses, while electrolytes lacking depolarizers (Electrolytes A and D) maintained a level discharge voltage during repeated pulsing.

Figure 5A:
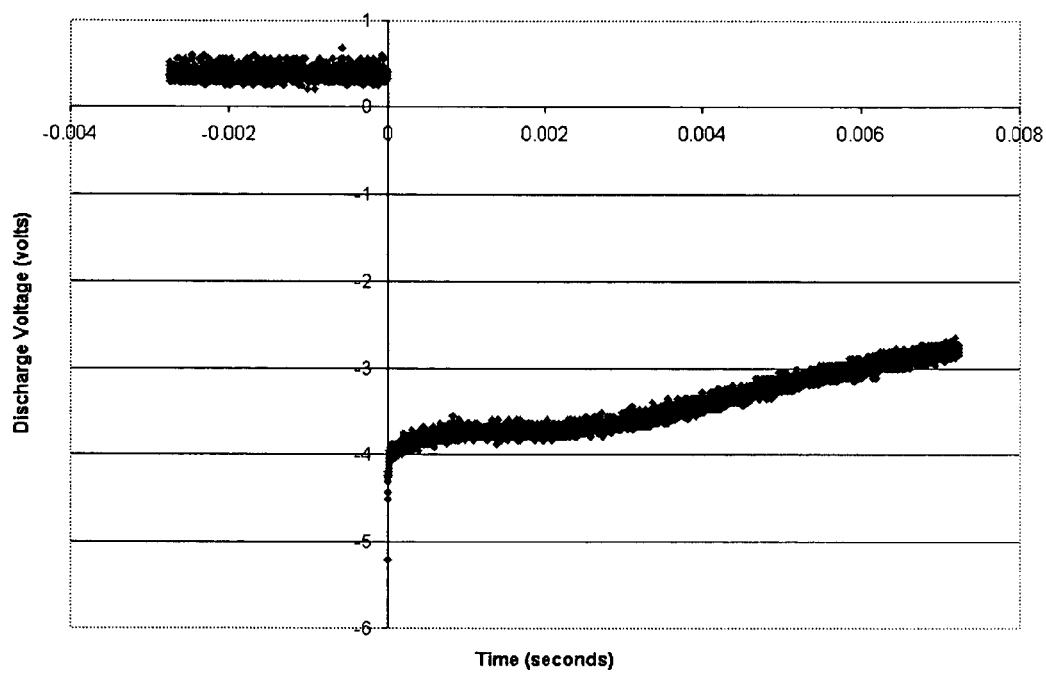
FIG. 5A shows a discharge voltage curve for a slide capacitor having titanium foil cathodes according to the present invention, impregnated with an ammonium azelate and boric acid in ethylene glycol electrolyte.
Figure 5B:
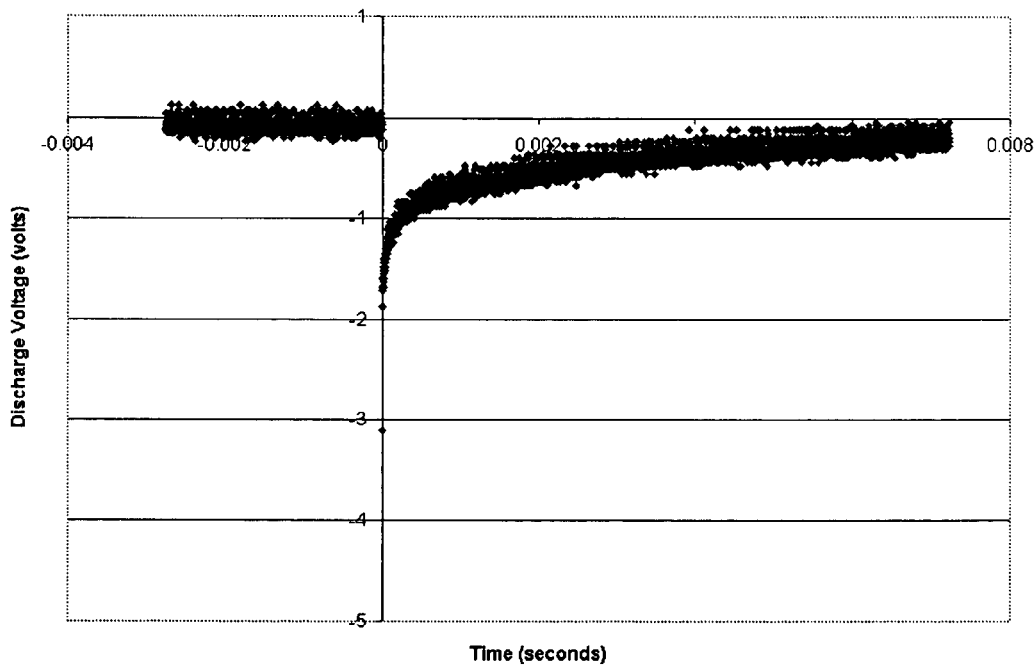
FIG. 5B shows a discharge voltage curve for a slide capacitor having titanium foil cathodes according to the present invention, impregnated with an ammonium borate and ammonium phosphate in ethylene glycol electrolyte.

FIGS. 5A-5B depict the pulse discharge voltage drops for Electrolytes A and D, respectively. While the discharge curves of the slide capacitors impregnated with electrolytes without depolarizers were slightly different, both Electrolyte A and Electrolyte D resulted in a discharge that started at an initial, low voltage and then began to recover. The slide capacitors impregnated with Electrolyte B and Electrolyte C, on the other hand, both had a very short (less than one millisecond) delay in their recovery voltage, in which the discharge voltage continued to drop before the voltage increase began.

Figure 6:
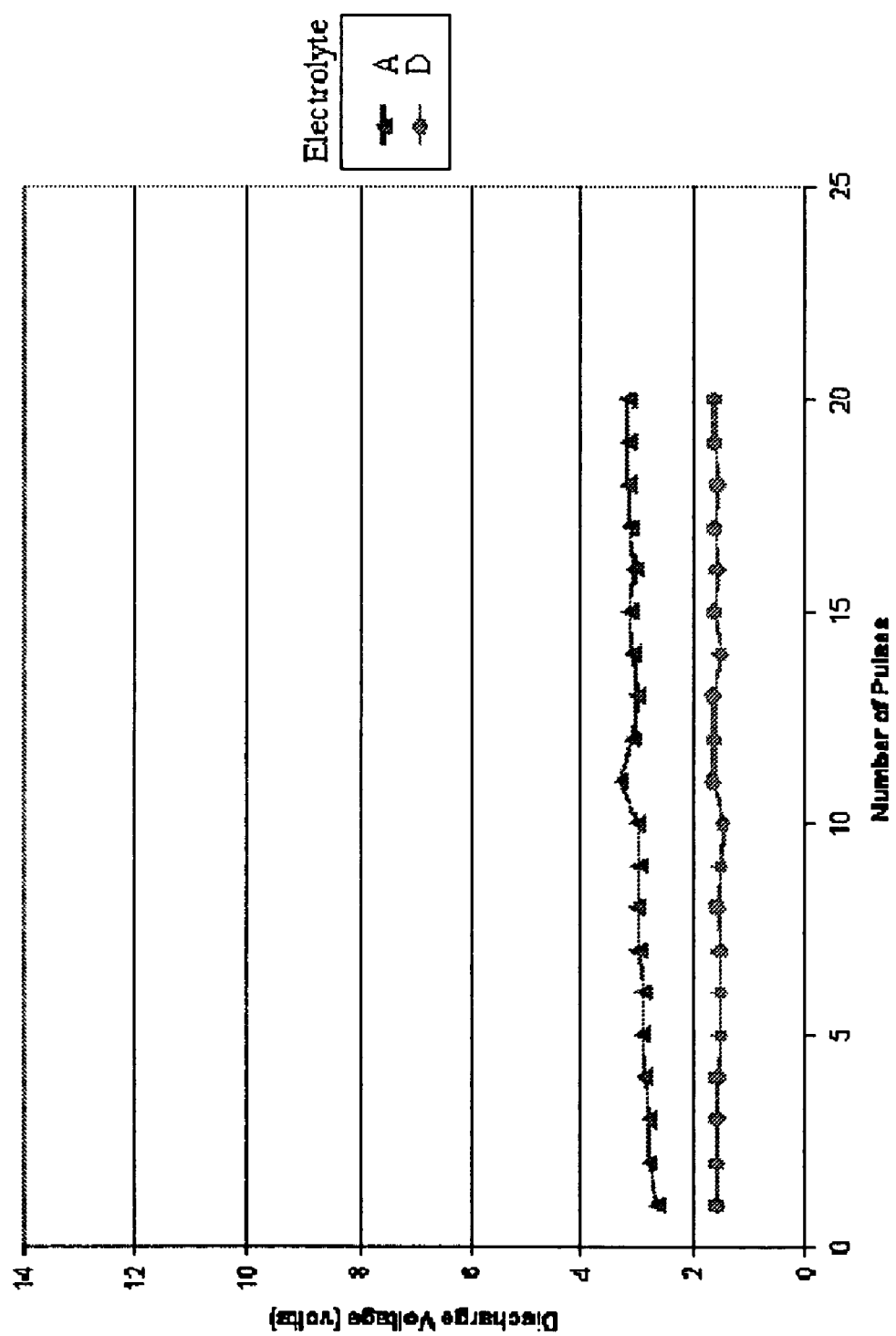
FIG. 6 shows a comparison of the discharge voltage behavior over a number of pulses for the slide capacitors in FIGS. 5A-5B.

FIG. 6 shows a comparison of the discharge voltage behavior of the slide capacitors impregnated with Electrolyte A and Electrolyte D over a number of pulses. The slide capacitors that were impregnated with Electrolyte A and Electrolyte D generally had an initial discharge voltage between 1.5 and 4.5 volts. Upon further pulsing, the slide capacitors maintained the original voltage within approximately one volt, plus or minus. When the slide capacitors were stored overnight in a sealed bag and pulsed again the next morning, they maintained a discharge voltage consistent with the original voltage (between 1.5V and 4.5V).

The slide capacitors that were impregnated with Electrolyte B and Electrolyte C acted differently. These slide capacitors generally had a discharge voltage at the first pulse between four and six volts. Upon further pulsing, the discharge voltage of these capacitors increased by between 0.3V-0.6V per pulse. When the slide capacitors were stored overnight in a sealed bag and pulsed again the next morning, the discharge voltage began at approximately the voltage where it had ended the previous day and then rose by the same increment (between 0.3V and 0.6V). The pulse discharge voltage of these capacitors showed no signs of leveling off during pulsing.

Example 3

To determine if placement of the platinum wire in the slide capacitors of Example 2 impacted the discharge voltage measured by the oscilloscope, several slide capacitors with two platinum wires were constructed. These slide capacitors contained two platinum wires side by side, between the same two layers of paper, at different positions. Each platinum wire was hooked to a separate oscilloscope probe tip. Two oscilloscope channels were used to measure the pulse discharge voltage at each platinum wire simultaneously.

This test revealed differences in the measured voltage at the two leads. In a slide capacitor impregnated with Electrolyte C the reported pulse discharge voltages of the two leads varied by about 2.5V after the first pulse. After repeated pulsing, the disparity between the two voltage measurements increased. After 20 pulses, the reported discharge voltage of one lead was approximately five volts higher than that of the other lead. In a slide capacitor impregnated with Electrolyte A, the reported pulse discharge voltages of the two leads varied by about 1.5V after the first pulse. After 20 pulses, the disparity between the two voltage measurements did not increase. For both types of electrolyte, the lead placed closer to the anode tab read a discharge voltage that was lower than the lead farther from the anode tab. This experiment showed that current density differences between lead locations cause cathode formation at different rates and hence greater voltages are seen by the probes. More suitable electrolytes reduced the formation effects and, hence, voltage increased.

Example 4

To determine if surface pretreatment of the titanium impacts the pulse discharge voltage of the titanium cathode slide capacitors of Example 2, various methods of cleaning the titanium foil were examined. The pulsing behavior of all previously discussed slide capacitors contained titanium that was pre-cleaned with an alcohol rinse. Additional pretreatments that were studied include an oxalic acid boil, a room temperature nitric acid soak, an 85° C. nitric acid soak, and a soak in SIMPLE GREEN industrial cleaner, available from Sunshine Makers, Inc., Huntington Harbour, Calif.

The oxalic acid pretreatment consisted of suspending the titanium foils for five minutes in a boiling 5% oxalic acid solution, then rinsing them in deionized (DI) water for five minutes. The slide capacitors constructed from the oxalic acid cleaned foil would not reach voltage at age so this method of pretreatment was deemed inappropriate.

The two nitric acid pretreatments both consisted of soaking titanium foils for five minutes in a 7% nitric acid solution, followed by a five minute deionized water rinse. One nitric acid solution was held at room temperature during the treatment and the other was held at 85° C. The slide capacitor built with titanium cleaned with hot nitric acid had a very noisy age and current bleed down. Additionally, the pulse discharge voltages for this treatment increased with each pulse in the same manner as all the other slide capacitors impregnated with Electrolyte C. The slide capacitor built with titanium cleaned with room temperature nitric acid had a more normal age and current bleed down than the one cleaned with hot nitric acid. The pulse discharge voltages for this pretreatment also increased with each pulse in the same manner as the other slide capacitors impregnated with Electrolyte C.

The SIMPLE GREEN pretreatment consisted of soaking titanium foils in a 5% SIMPLE GREEN solution for five minutes, followed by a five minute rinse in deionized water. The slide capacitor constructed with titanium cathode pretreated in this manner had a normal age and current bleed down. The pulse discharge voltage increased with each pulse in the same manner as the other slide capacitors impregnated with Electrolyte C.

Although the room temperature nitric acid treatment and the SIMPLE GREEN treatment did not present problems at age, they did not exhibit behavior different from other slide capacitors impregnated with Electrolyte C. None of the cleaning methods examined revealed a way to pretreat the titanium foil that would stop the discharge voltage climb that is seen with Electrolyte C.

No titanium cleaning method resulted in performance better than that of titanium pre-cleaned with water and alcohol.

Example 5

DC formation studies with titanium as anode confirm the correlation of the color of anodic oxides with their forming voltages to calibrate the oxide formed during pulsing. More importantly, they confirm the evolution of gas, or lack thereof, on cathode/electrolyte combinations like those producing swelling, or lack thereof, in pulsed defibrillator capacitors. It was also shown that depolarizers like 3'-nitroacetophenone and o-nitroanisole are only marginally effective in preventing hydrogen gas evolution in DC beaker experiments with aluminum cathodes, but quite effective with titanium and nickel.

The DC formation of titanium foils in Electrolyte C produced a series of interference colored films similar to other valve metals like tantalum. The colors began as a faint yellow at less than 10V followed by brilliant orange/brown and purple up to 30V. These colors were followed by fainter bluish, olive-green and yellow hues at 40, 50 and 60 volts. In the slide capacitors investigated, larger numbers of pulses generally led to increasingly brown images of the anode stack super-imposed upon the cathode similar to a map of the discharge current density. These images were very similar to those seen on the titanium cathodes from the production-style capacitors with many discharge cycles. Visual comparison suggested that the formation voltage did not exceed 10-20 volts in most areas of the pulse-discharged foils. Also there was a characteristic brownish-yellow coating formed on titanium cathodes removed from defibrillator capacitors which had survived 2500 discharges with minimal swelling using Electrolyte A.

Example 6

Various metals, including titanium, nickel and aluminum, were evaluated for gas evolution in various electrolytes.

In Electrolyte A, minimal gassing was seen on titanium cathodes compared to aluminum cathodes in either electrolyte. Titanium foil exposed to cathode current in Electrolyte A had much less gas evolution than raw aluminum foil. Grade 2 titanium demonstrated less gas production than many metals tested, although palladium and lead had preferable gas evolution levels when compared to titanium. The use of 100V formed aluminum as cathode did not affect the production of gas bubbles. Formed titanium cathodes also bubbled slightly in the same way as untreated titanium.

Neither the titanium or nickel cathode foils evolved any detectable gas bubbles despite the formation times ranging up to one hour in Electrolyte C at room temperature and 1.25 mA/cm$^2$. The same was true for Becromal K30B black cathode materials. Substitution of an unetched and uncoated aluminum cathode led to prompt bubbling on the cathode foils, beginning at the cut edges where the current density was the highest. Use of high surface area aluminum foil made by a deposition process led to the same results on the cut edges with a slower start to bubbling on the high surface area faces of the foils. The slowness of bubble formation on the faces may have been due to the need to accumulate a greater amount of hydrogen to reach the critical bubble formation density on the high surface area material. A small platinum wire was flattened and used as a cathode as well with a minor amount of gassing being seen after 2 minutes.

When used as anode, titanium foils did not evolve gas until the forming voltage moved into the 40-volt range while nickel foils would not support a voltage beyond the ohmic drop of the solution.

Example 7

In order to determine the effect of the depolarizer in Electrolyte C on the results, some of the same foils were tested in electrolyte A, which has no depolarizer. Aluminum cathode bubbled promptly again as with Electrolyte C. Titanium cathode bubbled slightly at 1.25 mA/cm$^2$ but was not so apparent at 0.25 mA/cm$^2$. Nickel cathode bubbled in a somewhat intermediate fashion but not when used as anode. Nickel anode did not form a noticeable oxide or any oxygen bubbles when anodic in Electrolyte C.

Additionally, 1.5% o-nitroanisole [ONA] was dissolved in electrolyte A by stirring vigorously at 70° C. for several minutes, and then cooled. As with Electrolyte C, the unetched and uncoated aluminum cathode and the high surface area material bubbled, but not the titanium or nickel foils. To test a different formulation, electrolyte D was evaluated. Aluminum bubbled readily and the titanium only somewhat less so. Addition of 1% ONA to electrolyte D reduced the aluminum bubbling slightly but greatly reduced the bubbling on titanium.

Example 8

To determine if titanium is a superior choice for cathode material numerous metals were formed in cathodic current and the amount of gas produced during exposure to current was measured. Numerous metal foil materials were evaluated to determine how much gas was evolved during the application of 0.1 mA/cm$^2$ of cathodic current at 25° C. to the foils. Both pure metals and metal alloys were tested in Electrolyte A to ascertain how much gas was produced. Metals evaluated include aluminum, grade 1 titanium, grade 2 titanium, palladium, lead, nickel, tin, platinum, silver, gold, zirconium, molybdenum, tantalum, a palladium-silver alloy, a titanium nitride coating on aluminum, a platinum-rhodium alloy, a platinum-ruthenium alloy, and a platinum-iridium alloy.

Figure 7A:
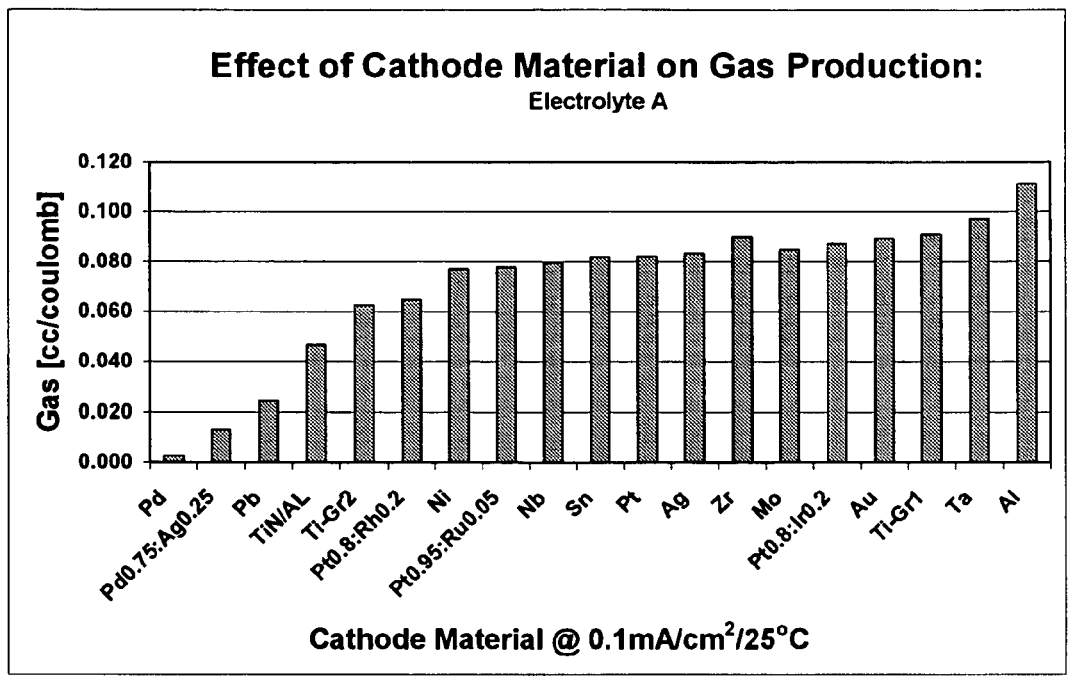
FIG. 7A shows gas production of numerous metal foil cathode materials formed in a 0.1 mA/cm$^2$ cathodic current at 25° C. in an ammonium azelate and boric acid in ethylene glycol electrolyte.

FIG. 7A displays the results of this testing. Aluminum produced the most gas of any of the metals tested. Grade 2 titanium fared much better, but did not result in as little gas production as present with palladium or lead. Titanium nitride coated aluminum also had slightly less gas evolution than unetched and uncoated titanium foil.

In a separate investigation, aluminum foils and grade 2 titanium foils were exposed to the same amount of current (0.1 mA/cm$^2$) at 25° C. in different electrolytes and the amount of gas evolved was measured. Electrolytes used include Electrolyte A, Electrolyte C, an azelate type electrolyte (hereinafter "Electrolyte E"), an adipate based electrolyte (hereinafter "Electrolyte F"), and an ammonium pentaborate based electrolyte (hereinafter "Electrolyte G"). Additionally, aluminum foil was tested in electrolyte B, which is Electrolyte A with 1% ONA (a depolarizing agent) added.

Figure 7B:
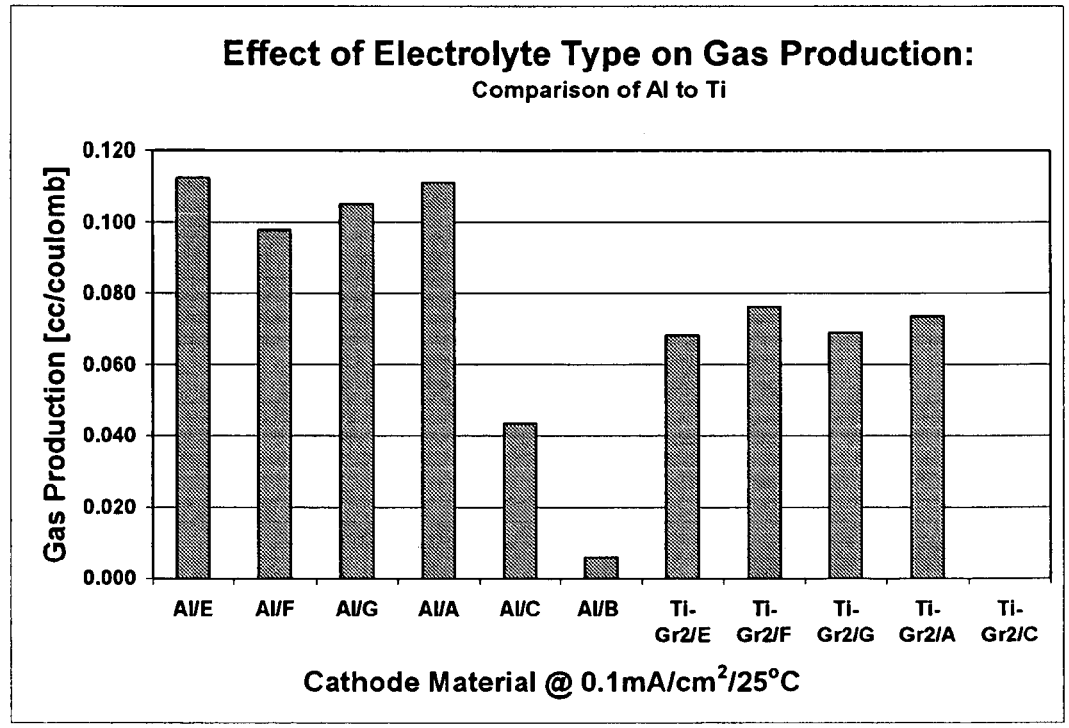
FIG. 7B shows gas production of aluminum and titanium foil cathode materials formed in a 0.1 mA/cm$^2$ cathodic current at 25° C. in varying electrolytes.

As can be seen in FIG. 7B, titanium foil produced less gas than aluminum for all five types of electrolyte tested with both metals. Metals exposed to current in electrolytes that contain a depolarizing agent (Electrolytes B and C) had less gas evolution than those that were examined in electrolytes that did not contain a depolarizer. Grade 2 titanium did not produce any measurable amount of gas in this experiment when exposed to current in Electrolyte C.

Titanium foils were shown to have less gas evolution than aluminum when exposed to 0.1 mA/cm$^2$ of cathodic current in Electrolyte A. However, some other metals, including palladium and lead, evolved less gas than the titanium foil. When both aluminum and titanium foils were evaluated for gas production in various electrolytes, titanium evolved less gas regardless of the electrolyte tested. Most notably, titanium foil did not produce any appreciable amount of gas when exposed to 0.1 mA/cm$^2$ of cathodic current in Electrolyte C, an electrolyte that contains a depolarizing agent.

Looking at the gas production in a normal electrolyte with no depolarizer present (FIG. 7A), the titanium foil and titanium nitride on aluminum cathode provide minimal amounts of gassing, whereas lead, palladium and palladium silver alloy produce even less. Aluminum produces more gas than any other metal tested. However, combining titanium with a common depolarizer produces essentially no gas (FIG. 7B). This indicates that despite a 120 Hz capacitance measurement lower than with etched aluminum, the use of titanium and similar cathode materials will inhibit gas production and not cause the capacitor to swell. Furthermore, the stored to delivered energy ratio is acceptable for a capacitor with a 30 micron and thinner foil as the cathode material.

Example 9

As discussed above, gas was produced during pulsing of raw metal capacitors. However, it was not known if this gas formation occurred during the charge phase or discharge phase. To test at which point the gas is primarily evolved, a simulated capacitor was constructed using a four anode stack and two separate aluminum cathodes. Aluminum metal was used as cathode to maximize gas production, so an appreciable amount of gas could be seen after a limited amount of pulsing.

The anode stack and each aluminum cathode were placed in separate tubes, which were filled with Electrolyte A and inverted in a large beaker of Electrolyte A. One aluminum cathode was used during charging of the mock capacitor, and the other was used during discharging. The anode stack was attached to a positive lead and the aluminum cathode used during charging was hooked to a negative lead. They were aged to 405V at 0.1 mA before being pulsed. Some gas was collected in the charge tube during aging.

Following aging, the capacitor was pulsed. During charging the negative lead was attached to the cathode in the charge tube, while during discharge the negative lead was attached to the aluminum cathode in the discharge tube. This allowed any gas produced during pulsing to be quantified in the appropriate tube.

After 50 pulses, it was readily apparent that more gas was collecting in the charge tube than in the discharge tube. After 100 pulses, about 0.25 cc of gas was collected in the tube for the charge cathode, while there was only a small bubble collected in the discharge cathode tube.

The examination of a mock capacitor containing untreated aluminum cathode material revealed that gas is primarily evolved during the charge phase, rather than the discharge phase, of pulsing. This observation confirms the DC observation of a lack of gas evolution from aluminum or titanium foils during anodic bias (comparable to the discharge phase) and implies that the formation of the cathode foil has consequences mainly for the bridge capacitance rather than gas evolution. It further illustrates the benefits of depolarizers, which are reduced under cathodic bias during recharge in preference to $H_2$ evolution, especially with Ti as the cathode foil.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all references cited herein, including journal articles or abstracts, published or corresponding U.S. or foreign patent applications, issued U.S. or foreign patents, or any other references, are each entirely incorporated by reference herein, including all data, tables, figures, and text presented in the cited references.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An electrolytic capacitor comprising a multiple anode flat, stacked capacitor configuration and an unetched, uncoated metal foil cathode electrode, wherein:
   said metal foil is selected from the group consisting of titanium, palladium, lead, nickel, tin, platinum, silver, gold, zirconium, molybdenum, tantalum, palladium-silver alloy, platinum-rhodium alloy, platinum-ruthenium alloy, and platinum-iridium alloy; and
   said electrolytic capacitor is impregnated with an ethylene glycol based electrolyte.

2. An electrolytic capacitor according to claim 1, wherein said multiple anode flat, stacked capacitor configuration comprises a plurality of stacked units, each unit comprising a cathode, a spacer, at least two anodes, a spacer and a cathode, with neighboring stacked units sharing the cathode between them.

3. An electrolytic capacitor according to claim 2, wherein one of said stacked units comprises at least three anodes.

4. An electrolytic capacitor according to claim 2, wherein said anodes comprise high surface area, formed aluminum foil.

5. An electrolytic capacitor according to claim 2, wherein said spacer is a Kraft paper spacer.

6. An electrolytic capacitor according to claim 2, wherein said spacer is a porous polypropylene separator.

7. An electrolytic capacitor according to claim 1, wherein said cathode electrode is not more than 30 microns thick.

8. An electrolytic capacitor according to claim 1, wherein said cathode electrode is 10-30 microns thick.

9. An electrolytic capacitor according to claim 1, wherein said cathode electrode is 15 microns thick.

10. An electrolytic capacitor according to claim 1, wherein said electrolyte comprises ammonium azelate and boric acid in ethylene glycol.

11. An electrolytic capacitor according to claim 1, wherein said electrolyte comprises ammonium borate and ammonium phosphate in ethylene glycol.

12. An electrolytic capacitor according to claim 1, wherein said electrolyte further comprises a cathode depolarizer.

13. An electrolytic capacitor according to claim 12, wherein said electrolyte comprised one percent by weight of said cathode depolarizer.

14. An electrolytic capacitor according to claim 12, wherein said cathode depolarizer is o-nitroanisole.

15. An electrolytic capacitor according to claim 12, wherein said cathode depolarizer is 3'-nitroacetophenone.

16. An electrolytic capacitor according to claim 1, wherein the realized capacitance from said multiple anode flat, stacked capacitor configuration is at least 97%.

17. An implantable cardiac defibrillator (ICD) comprising an electrolytic capacitor according to claim 1.

* * * * *